US005668252A

United States Patent [19]
Yokoi et al.

[11] Patent Number: 5,668,252
[45] Date of Patent: Sep. 16, 1997

[54] DRYING PROCESS OF VISCOUS SOLUTION CONTAINING (METH)ACRYLIC ACID-BASED POLYMER

[75] Inventors: Tokihiro Yokoi; Keishi Tsuboi, both of Hyogo, Japan

[73] Assignee: Nippon Shokubai Co., Ltd., Osaka, Japan

[21] Appl. No.: 526,223

[22] Filed: Sep. 11, 1995

[51] Int. Cl.$^6$ .................................................. C08F 6/10
[52] U.S. Cl. ................................................ 528/503
[58] Field of Search ........................ 526/317.1, 930; 528/503; 264/204, 234, 235.6, 331.18, 331.21

[56] References Cited

U.S. PATENT DOCUMENTS

| | | | |
|---|---|---|---|
| 4,138,539 | 2/1979 | Landolt et al. | 528/503 |
| 4,286,082 | 8/1981 | Tsubakimoto et al. | 528/503 |
| 4,914,170 | 4/1990 | Chang et al. | 526/317.1 |

FOREIGN PATENT DOCUMENTS

| | | |
|---|---|---|
| 5 117306 | 5/1993 | Japan. |
| 6-41313 | 2/1994 | Japan. |

OTHER PUBLICATIONS

Polymer Engineering and Science, vol. 31, No. 12, pp. 867–872, Jun. 1991, Jung–Ki Park, et al., "Effect of Drying Conditions on the Glass Transition of Poly(Acrylic Acid)".

*Primary Examiner*—Thomas R. Weber
*Attorney, Agent, or Firm*—Oblon, Spivak, McClelland, Maier & Neustadt, P.C.

[57] ABSTRACT

A method of drying a viscous solution containing a (meth) acrylic acid-based polymer or copolymer containing (meth) acrylic acid and/or a salt thereof as a monomer unit, the degree of neutralization of the acid group contained in the polymer being not more than 50 mol %, wherein the method comprises subjecting the solution to, or passing the solution through, a drying zone, in the form of a line, so that the solvent in the solution is removed.

14 Claims, 4 Drawing Sheets

DRYING PROCESS OF VISCOUS SOLUTION CONTAINING (METH)ACRYLIC ACID-BASED POLYMER

BACKGROUND OF THE INVENTION

A homopolymer or a copolymer containing (meth)acrylic acid and/or a salt thereof as a monomer component (hereinafter referred to as a (meth)acrylic acid-based polymer), has excellent adhesive properties, thickening properties, water absorption properties, and flocculating properties and the like, and by the use of such properties, the (meth)acrylic acid-based polymer has been widely used as a thickening agent, a self-adhesive for a cataplasm, an intensifier for paper, a curing agent, a flocculating agent, a dehydrating agent and a soil conditioning agent and the like. Above all, a (meth)acrylic acid-based polymer having a low degree of neutralization made of poly(meth)acrylic acid or (meth)acrylate whose degree of the neutralization is not more than 50 mol %, shows particularly outstanding performance in the above-mentioned uses. When a (meth) acrylic acid-based polymer is employed for such a use, it is supplied in the form of a powder or a granule in many cases, in taking into consideration of easy blending, convenient handling and convenient transportation.

By the way, methods of producing a (meth)acrylic acid-based polymer includes bulk polymerization, suspension polymerization, emulsion polymerization, slurry polymerization, solution polymerization and the like, but the methods used most extensively among them are the solution polymerization and the slurry polymerization.

When a slurry polymerization method is employed, a polymerizable monomer mainly comprising (meth)acrylic acid or a salt thereof and a radical polymerization initiator are polymerized in an organic solvent which is a poor solvent of the polymerization product, to give a (meth) acrylic acid-based polymer as a precipitate. On the other hand, when a solution polymerization method is employed, a polymerizable monomer mainly comprising (meth)acrylic acid or a salt thereof is dissolved in a solvent such as water, a radical initiator is added thereto and they are appropriately heated, if necessary, so that a polymerization reaction is carried out to give a (meth)acrylic acid-based polymer as a viscous solution.

The precipitate of a (meth)acrylic acid-based polymer obtained by slurry polymerization can be easily powdered by vacuum drying and the like, however, this process has been presenting a problem of requiring investment on new plants and equipments for removing and recovering the organic solvent, and for preventing explosion, and a problem as to the safety of the organic solvent remaining in the polymer. Another drawback is that the molecular weight of the resultant polymer can be controlled only in a relatively small range.

On the other hand, the solution of a (meth)acrylic acid-based polymer obtained by solution polymerization, particularly by aqueous solution polymerization, having a high degree of neutralization exceeding 50 mol %, has low adhesive properties and low film forming properties, therefore the solvent can be relatively easily evaporated by a known drum dryer, a ventilation type hot air dryer and the like, to give a polymer in the form of a powder. However, a solution, particularly an aqueous solution containing a (meth)acrylic acid-based polymer having a low degree of neutralization, which is not more than 50 mol %, has such high adhesive properties that, after the drying process the adhered polymer on the dryer is difficult to be detached, and since the film forming properties are high, drying of the surface layer, which is the plane through which the solvent evaporates, causes skinning to prevent the incorporated solvent from evaporating. One possible way to remove the incorporated solvent on the condition that skinning is to crush it during the drying process to expose the interior which is not yet dried, however, the (meth)acrylic acid-based polymer having a low degree of neutralization has a low glass transition temperature, and cannot be easily crushed. If the drying temperature is raised excessively, the surface layer becomes over-heated to allow branching reaction, cross-linking reaction and the like, that results in lowering of the solubility in water or generating a water insoluble product, or to allow depolymerization which will give a bad effect on the thickening properties of the polymer when the polymer is dissolved again.

The present inventors have paid attention to the above-mentioned problems of the prior art and have been studying on a method of drying a viscous solution, particularly an aqueous solution, containing a (meth)acrylic acid-based polymer having a low degree of neutralization which is not more than 50 mol %, by efficiently removing water from the solution, and have already suggested a drying method disclosed in Japanese Patent Laid Open Hei 6-41313 (Publication date: Feb. 15, 1994) as a part of the result of the study. The invention disclosed in the above specification is a method of drying an aqueous solution containing a (meth) acrylic acid-based polymer which has a degree of neutralization that is not more than 50 mol % and a water content of more than 45%, comprising first step wherein pre-heating is carried out to a temperature not more than about 70° C., second step wherein the overall water content is lowered to around 40% while the surface temperature is controlled to 70°–150° C., and the difference between the surface temperature and the internal temperature is controlled to be not more than 50° C., and third step wherein the overall water content is lowered to be not more than 10% while the surface temperature and the internal temperature are kept at 80°–170° C. and the difference between the surface temperature and the internal temperature is controlled to be not more than 50° C. By employing this method, the water content of a (meth)acrylic acid-based polymer can be efficiently reduced to give a dried substance while the change of properties of a (meth)acrylic acid-based polymer by heat is prevented.

This process, however, requires three-step drying processes and exact control of the surface temperature, and the internal temperature of the substance to be dried, and further requires even exact control of the difference between the surface temperature and the internal temperature, and the operation including the temperature control is troublesome.

SUMMARY OF THE INVENTION

The present invention is achieved in view of the above-mentioned problems of the known art, or the prior invention, and it is an object of the present invention to provide a method of drying a viscous solution containing a (meth) acrylic acid-based polymer having a low degree of neutralization which is hard to be dried, wherein the change of the properties of the polymer by heat, lowering of water re-solubility or thickening properties caused by a crosslinking reaction and the like are prevented in the drying step, and a dried product of said polymer having excellent storing stability can be efficiently obtained, and thereby, a polymer in a dry state having excellent properties as a self-adhesive, a thickening agent, and a flocculating agent can be efficiently produced.

The drying method according to the present invention by which the above-mentioned object can be achieved, is a method of drying a viscous solution containing a (meth)acrylic acid-based polymer which comprises a homopolymer or a copolymer containing (meth)acrylic acid and/or a salt thereof as a monomer unit, wherein the degree of neutralization of the acid group contained in said polymer is not more than 50 mol %. The method is characterized by allowing said solution exist in or pass through a drying zone, in the form of a continuous or intermittent line, so that the solvent in the solution is removed.

The above-mentioned method can be carried out in such processes as process (1) wherein a viscous solution containing a (meth)acrylic acid-based polymer is passed through a drying zone, by providing the solution in the form of a line on a sheet running through the drying zone, process (2) wherein a viscous solution containing a (meth)acrylic acid-based polymer is discharged in the form of a line through a lot of nozzles provided in a discharge device and passed through a drying zone, and process (3) wherein a viscous solution containing a (meth)acrylic acid-based polymer is placed in the form of a line, inside of a dryer such as a hot air dryer, and dried. The most practical process is the process (1). The viscous solution containing a (meth)acrylic acid-based polymer to which this drying process (1) can be applied includes various solutions of organic solvents or an aqueous solution, but the most extensively used is an aqueous solution containing a (meth)acrylic acid-based polymer.

When the aqueous solution containing a (meth)acrylic acid-based polymer is used, it is preferable to keep said drying zone under normal pressure and to control the temperature of the drying zone to be in the range of 100° to 230° C., or to keep the drying zone under reduced pressure and to control the temperature of the drying zone to be in the range of 70° to 200° C., since in such conditions, the (meth)acrylic acid-based polymer can be effectively dried while the change of its properties and the like can be more securely prevented.

When the above-mentioned process (1) is employed, wherein the viscous solution containing a (meth)acrylic acid-based polymer is passed through the drying zone by providing the solution in the form of a line on the sheet running through the drying zone, it is preferable to control the total resting area of the viscous solution containing a (meth)acrylic acid-based polymer resting in the form of a line on the sheet, to be not more than 80% (preferably in the range of 15 to 75% ) of the heat transmission area of the sheet, and the thickness of the viscous solution containing a (meth)acrylic acid-based polymer resting in the form of a line on the sheet to be in the range of 0.5 to 10 mm (preferably 1 to 5 mm), the width of the line to be in the range of 0.5 to 100 mm (preferably 1 to 50 mm, more preferably 2 to 5 mm), the cross-sectional area of the line to be in the range of 0.03 to 0.2 cm$^2$ the distance between the neighboring linear bodies to be in the range of 0.5 to 100 mm (preferably 1 to 30 mm, more preferably 3 to 15 mm), so that the drying can be more efficiently carried out. To facilitate the removal of the dried product of the viscous solution containing a (meth)acrylic acid-based polymer dried on the above-mentioned sheet, it is cooled to a temperature not more than 60° C., then removed from the sheet.

The viscous solution containing a (meth)acrylic acid-based polymer to which the drying method of the present invention is applied includes all the viscous solutions containing a (meth)acrylic acid-based polymer which can be produced by solution polymerization utilizing an aqueous solution or an organic solvent, and particularly when the viscous solution containing the (meth)acrylic acid-based polymer produced by solution polymerization utilizing an azo compound as a radical polymerization initiator is dried according to the present process, the resulting dried product shows very good stability when it is stored in a dry state.

According to the drying method of the present invention, the viscous solution containing a (meth)acrylic acid-based polymer is passed through a drying zone in the form of a line and dried, as described above, and a feature of this method lies in that the drying efficiency can be increased by enlarging the drying effective surface area, and, to successfully provide the polymer in such a linear form for passing it through the zone, it is preferable for the viscosity of the viscous solution containing a (meth)acrylic acid-based polymer at 25° C. to be in the range of 100 to 1,000,000 cps (preferably 1,000 to 500,000 cps, more preferably 5,000 to 100,000 cps), and the preferable molecular weight of the (meth)acrylic acid-based polymer by weight average molecular weight is in the range of 5,000 to 5,000,000 (more preferably 10,000 to 3,000,000).

DETAILED DESCRIPTION OF THE PREFERRED EMBODIMENTS

As described above, the drying method according to the present invention is basically a method of drying a viscous solution containing a (meth)acrylic acid-based polymer which comprises a homopolymer or a copolymer containing (meth)acrylic acid and/or a salt thereof as a monomer unit, wherein the degree of neutralization of the acid group contained in the polymer is not more than 50 mol %. This method is characterized by allowing said solution exist in or pass through a drying zone, in the form of a line (a continuous line or an intermittent line), so that the surface area effective in evaporation of the solvent is enlarged and thereby the solvent in the solution is efficiently removed.

Referring to the (meth)acrylic acid-based polymer to which the drying method of the present invention is applied, the main monomer composing said polymer is acrylic acid, methacrylic acid and/or a salt thereof (hereinafter referred to as (meth)acrylic acid (salt)). In a preferable a (meth)acrylic acid-based polymer, 70 mol % or more, preferably 90 mol % or more of all the monomers composing the polymer are made of (meth)acrylic acid (salt). Here, the salt in a (meth) acrylic acid-based polymer means a salt of mono-valent such as a salt of an alkali metal such as sodium, potassium and lithium or an ammonium salt, and a salt of a poly-valent metal (di, tri or higher), such as calcium or aluminium is not included in the salt of the present invention since it is hard to be dissolved in water or in an organic solvent.

Illustrative examples of other copolymerizable monomers to be contained, depending on the necessity, include a monomer containing carboxyl group such as maleic acid, fumaric acid, and itaconic acid; a monomer containing sulfonate group such as vinylsulfonic acid, methallyl sulfonic acid, allylsulfonic acid, and 3-(meth)allyloxy-2-hydroxypropanesulfonic acid; an amide type monomer such as (meth)acrylamide, and tert-butyl (meth)acrylamide; an allylether type monomer such as glycerol mono(meth)allylether; a monomer containing hydroxyl group such as 2-hydroxyethyl(meth)acrylate, allylalcohol, 3-methyl-3-butene-1-ol(isoprenol), and glycerol mono(meth)acrylate; a nitrile type monomer such as (meth)acrylonitrile; a (meth)acrylate ester type monomer such as methyl (meth)acrylate, ethyl (meth)acrylate, propyl (meth)acrylate, and butyl (meth)acrylate; a vinyl type monomer such as vinyl acetate; a styrene type monomer such as styrene, α-methyl styrene, and styrenesulfonic acid, and one or more of these monomers can be copolymerized with (meth)acrylic acid (salt), if necessary.

Among these copolymerizable monomers, a preferable copolymerizable component for obtaining a water soluble copolymer is a monomer containing carboxyl group such as maleic acid, fumaric acid and itaconic acid.

The (meth)acrylic acid-based polymer is required to be water soluble since the dried substance of the polymer obtained according to the present invention is utilized as a self-adhesive, a thickening agent and a flocculating agent, mostly after it is dissolved in water, and from this point of view, it is preferable to control the amount of the (meth)acrylic acid (salt) to be not less than 70 mol % of all the monomers, and the amount of the other copolymerizable monomers to be not more than 30 mol % of all the monomers, in order to obtain a polymer having a high level of water solubility.

According to the present invention, the degree of neutralization of the (meth)acrylic acid-based polymer is specified to be not more than 50 mol %, and this is not only because the drying method of the present invention is effective in drying the viscous solution containing a (meth)acrylic acid-based polymer (particularly an aqueous solution) having such a low degree of neutralization but also because among the (meth)acrylic polymers, one having a degree of neutralization which is as low as not more than 50 mol % shows excellent performance when it is used as a self-adhesive, a thickening agent, a flocculating agent and the like. As a means to obtain a polymer having such a low degree of neutralization 1) a process wherein the degree of neutralization of all the monomers including the (meth)acrylic acid-based monomers and other copolymerizable monomers, subjected to solution polymerization is controlled to be not more than 50 mol %, 2) a process in which solution polymerization is carried out by using monomers wherein all the acid component is acid group, then partial neutralization is carried out with a base so that the neutralization ratio of the acid group contained in the resulting polymerization product becomes not more than 50 mol %, 3) a process in which solution polymerization is carried out by using monomers wherein all the acid component exists as a neutralized salt, then 50 mol % or more of the neutralized salt in the resulting polymerization product is liberated with an acid, and the like can be employed. However, it is not so useful to employ the present invention for a (meth)acrylic acid-based polymer having a high degree of neutralization over 50 mol % since it only provides poor tackiness when it is dissolved in water and therefore shows inferior performances as a self-adhesive, a thickening agent and a flocculating agent, and because of its low film forming capacity, it can be easily dried even without employing the drying method of the present invention.

The (meth)acrylic acid-based polymer to be dried by the drying method of the present invention can be obtained by solution polymerization. In the solution polymerization, a solution containing a (meth)acrylic acid (salt)-based monomer or other copolymerizable monomers to be used if necessary, is mixed with a radical polymerization initiator and polymerization is carried out by heating, if necessary, to give a solution in the form of viscous liquid or gel according to the concentration of the polymer in the solution and the molecular weight of the polymer.

By employing the solution polymerization, a polymer of a desired molecular weight which can be varied in a wide range can be obtained by changing the monomer concentration in the reaction solution, temperature conditions and the kind of the catalyst to be used. The solution polymerization can be carried out using an organic solvent such as acetone, methyl ethyl ketone and dimethyl sulfoxide, however, since the main use of the dried product of a (meth)acrylic acid-based polymer obtained according to the present invention is the a self-adhesive, a thickening agent, a flocculating agent and the like as mentioned before, and in most cases it is dissolved in water for the use, the most preferable method to obtain such a water soluble polymer is an aqueous solution polymerization process. Even when an aqueous solution polymerization process is employed, a small amount of a water soluble organic solvent such as acetone, methanol, methyl ethyl ketone, dimethyl sulfoxide and the like can be added in some cases.

A radical polymerization initiator is not specially limited to any compound as far as it can be dissolved in a solvent used for polymerization and produces a radical by heat or light, and its illustrative examples include, an azo compound such as azobis-2-amidinopropane dihydrochloride, azobis-2-methyl-propionamide dihydrate, and azobis isobutylonitrile; a persulfate such as ammonium persulfate and sodium persulfate; an organic peroxide such as benzoyl peroxide; hydrogen peroxide; redox initiator comprising a combination of a peroxide and a reducing agent represented by a sulfite and amines. Particularly an azo compound is preferable since it gives a (meth)acrylic acid-based polymer having excellent storing stability as a dried product.

The viscosity of the viscous solution containing a (meth)acrylic acid-based polymer dried according to the present invention is in the range of 100 to 1,000,000 cps at 25° C., preferably 1,000 to 500,000 cps, more preferably 5,000 to 100,000 cps, and the preferable molecular weight in weight average molecular weight is 5,000 to 5,000,000, more preferably 10,000 to 3,000,000. When the solution having a low solution viscosity of less than 100 cps is dried in the drying process which will be described in detail hereinafter, particularly when the viscous solution containing a (meth)acrylic acid-based polymer is placed in the form of a line on a sheet running through the drying zone, the solution containing the polymer flows and spreads immediately and cannot be dried in a linear form. On the other hand, with the solution having the viscosity of over 1,000,000 cps, extrusion of the solution into the form of a line becomes difficult.

A solution having a weight average molecular weight of less than 5,000 has insufficient adhesive properties, film forming properties and flocculating properties, thus it cannot be effectively utilized as a self-adhesive, a thickening agent, a flocculating agent and the like, while a solution having excessively high molecular weight of more than 5,000,000 shows decreased solubility in water or compatibility with water, and thus it is not appropriate either as a self-adhesive, a thickening agent, a flocculating agent and the like.

Now, the drying method, which is the most significant feature of the present invention, will be explained in detail.

The present invention is characterized by allowing the above-mentioned viscous solution containing a (meth) acrylic acid-based polymer to pass through or exist in a drying zone, in the form of a line so that the solvent in the solution is removed. Illustratively, (1) a process wherein a viscous solution containing a (meth)acrylic acid-based polymer is placed in the form of a line on a sheet running through a drying zone then passed through the drying zone, (2) a process wherein a viscous solution containing a (meth)acrylic acid-based polymer is discharged in the form of a line through a lot of nozzles provided in a discharge device and passed through the drying zone, or (3) a process wherein a viscous solution containing a (meth)acrylic acid-based polymer is placed in the form of a line in a dryer such as hot air dryer and heated and dried, can be employed.

Among these processes, the most practical process is above-mentioned process (1).

Figure 1:
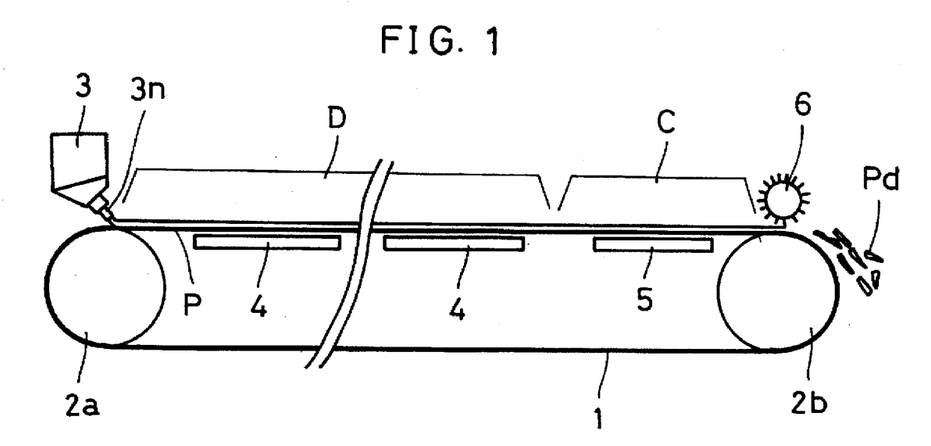
FIG. 1 is a schematic illustration showing the drying method employed in the Example, wherein 1: belt, 2a, 2b: roller, 3: feeder of polymerization product, 4: heating plate, 5: cooling plate, 6: scraper, P: viscous solution containing polymer (polymerization product), Pd: polymer dried product.
Figure 2:
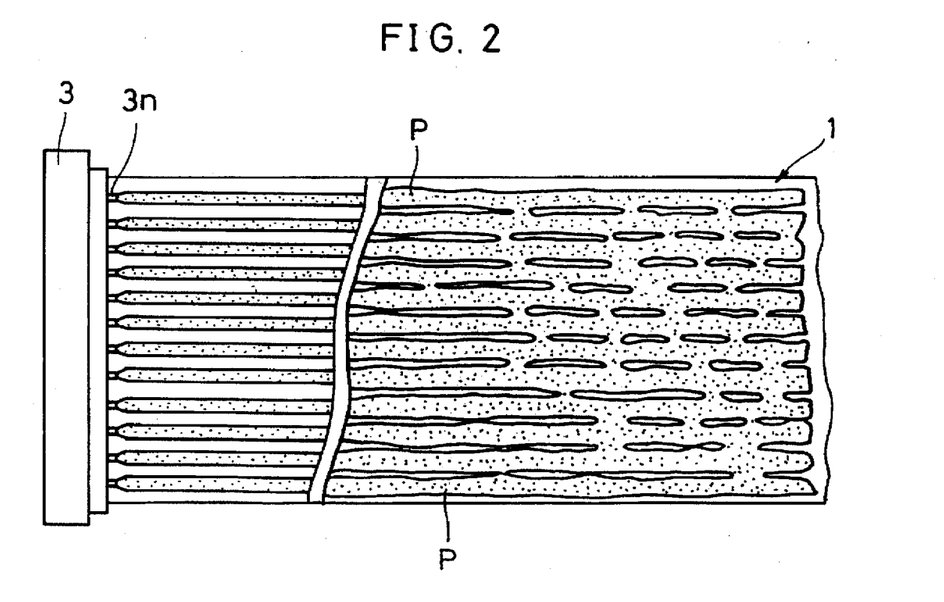
FIGS. 2, 3 and 4 are partial plan views showing how the solution is provided in the form of a line on the belt (sheet).

FIGS. 1 and 2 are schematic illustrations showing an illustrative example of the drying process (1); FIG. 1 is a vertical cross-sectional view and FIG. 2 is a plane view showing how the viscous solution containing the polymer is placed on the sheet. Referring now to FIG. 1, reference numeral 1 is a rotary belt, and it constitutes by itself a sheet on which the viscous solution containing a polymer to be dried is placed in the form of a line. 2a and 2b are rollers for rotating said belt continuously, 3 is a feeder for supplying a solution containing a polymer, 4 is a heating plate, 5 is a cooling plate, 6 is a scraper, P shows a viscous solution containing a (meth)acrylic acid-based polymer, Pd shows a dried product of said viscous solution containing a polymer, D shows a drying zone and C shows a cooling zone.

As for the belt 1 used in the present invention, a releasing resin such as polyethylene tetrafluoride, polyethylene trifluoride, polypropylene, polycarbonate and the like, formed into a sheet, a film or an endless belt is employed in order to facilitate the removal of the dried polymer substance. If necessary, a side plate can be provided to prevent the viscous solution containing a polymer from dripping or dropping. The point is to support the viscous solution containing a polymer on the upper surface of the belt, and any material can be utilized as far as it can support the solution on the upper surface. The sheet (belt) can be made of the above-mentioned releasing resin alone, or it can be made of a metal material such as stainless steel or a glass fiber cloth coated with a releasing resin, or made of a glass fiber cloth impregnated with the releasing resin. The point is, the surface of the belt has release characteristics so that the polymer placed in the form of a line on the upper surface is not tightly stuck on the surface when it is dried.

The releasing resin constituting the upper surface of the sheet is required to have only such a level of heat resistance that it is not melted nor plasticized under the temperature condition at which the viscous solution containing a polymer is heated and dried, however, the preferable temperature resistance is not less than 130° C., more preferably not less than 250° C. From these point of view, an illustrative example of a preferable releasing resin includes polyethylene tetrafluoride (Teflon) and the like. The higher the heat resistance of the sheet (belt) to be used is, the higher temperature during the drying process can be employed to increase the drying efficiency.

When the viscous solution containing a polymer is dried in the processes illustrated in FIG. 1 and FIG. 2, the viscous solution containing a polymer P is extruded through a plurality of discharge orifices 3n provided in the feeder 3 and placed in the form of a line on the rotating belt 1 on the upper stream side of the drying zone D. The method of providing the solution in the form of a line on the belt includes the method shown in FIG. 2 wherein the solution is discharged through a plurality of discharge orifices 3n and placed in the form of lines with appropriate intervals, and a method shown in FIG. 3 wherein the solution is discharged through one discharge orifice and placed in the form of a wiggly or zigzag line.

Figure 3:
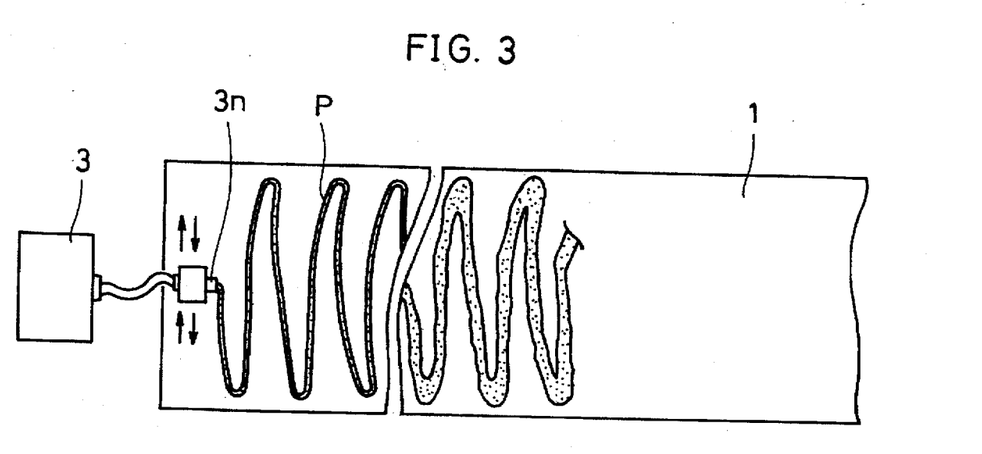

The viscous solution containing a polymer P is provided in the form of a line keeping an appropriate space (below-mentioned distance (d)) between the neighboring linear bodies of said viscous solution containing a polymer P at first when it is placed on the belt, however, as the FIG. 2 and FIG. 3 show, as the drying process proceeds, the linear bodies of the viscous solution containing a polymer P swells due to the foaming of the viscous solution containing a polymer P, and when the drying process is nearly completed, the linear bodies might be partly adhered to each other (see FIG. 7), which it does not matter when the drying process comes to an end.

Figure 4:
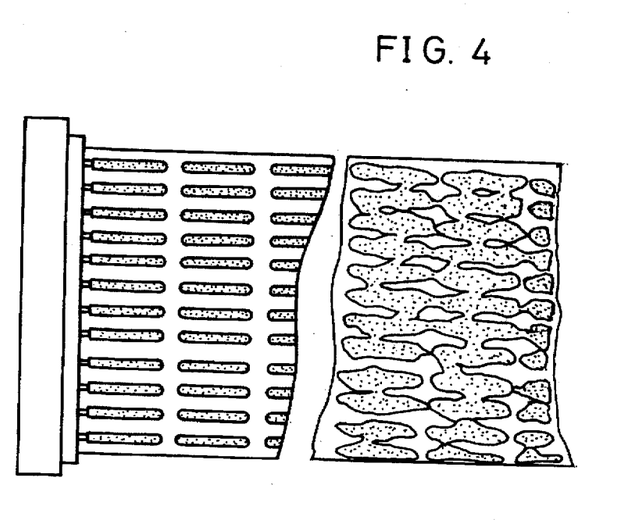

As for "the form of a line", which characterizes the form in which the viscous solution containing a polymer rests on the belt according to the present invention, not only "the form of a continuous line" shown in FIG. 1–FIG. 3 but also such a form as "the form of an intermittent line" shown in FIG. 4 can be effectively utilized, and for employing such a resting form of an intermittent line, a discharge device 3 illustratively shown in FIG. 2 can be utilized and the viscous solution containing a polymer P is intermittently discharged through the discharge orifices 3n. By changing the intermittent discharge time, the length (L) of each intermittent line can be freely controlled.

Figure 5:
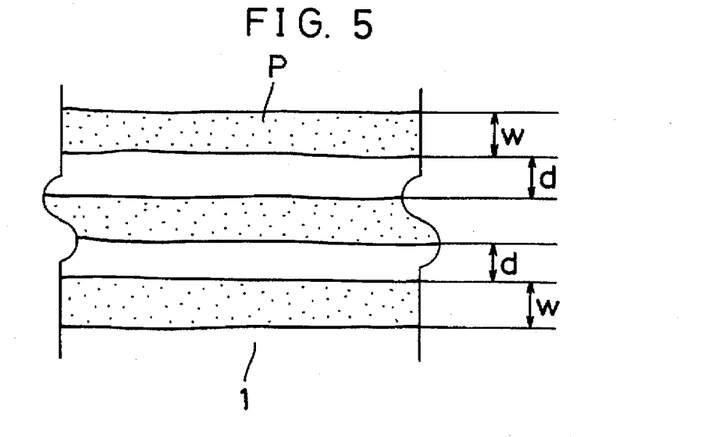
FIGS. 5 and 6 are schematic illustrations showing preferable thickness (t), width (w) and distance (d) of the viscous solution containing a (meth)acrylic acid-based polymer provided in the form of a line on the sheet.
Figure 6:
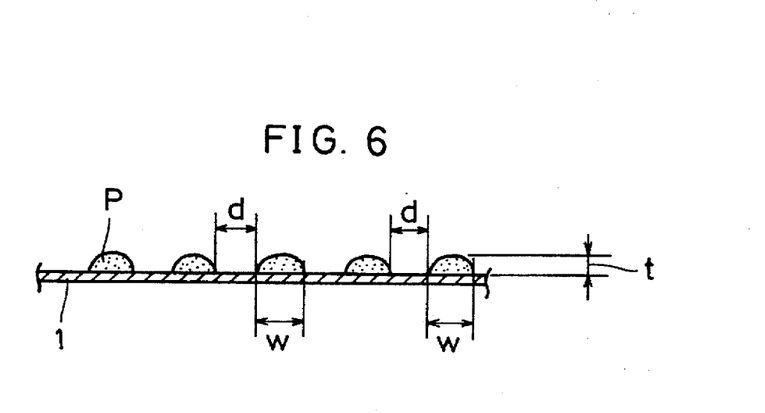

As shown in FIG. 5 (enlarged plane view) and FIG. 6 (enlarged cross-sectional view), for carrying out the drying process more efficiently, it is preferable to control the thickness (t) of the viscous solution containing a polymer P placed on the belt in the form of a line to be in the range of 0.5 to 10 mm (more preferably 1 to 5 mm), the width (w) of the line to be in the range of 0.5 to 100 mm (more preferably 1 to 50 mm, further more preferably 2 to 5 mm), the cross-sectional area to be in the range of 0.03 to 0.2 $cm^2$, the distance (d) between the neighboring linear bodies to be in the range of 0.5 to 100 mm (more preferably 1 to 30 mm, further more preferably 3 to 15 mm), and the total resting area of the viscous solution containing a polymer P resting in the form of a line to be not more than 80%, preferably to be in the range of 15 to 75%, of the heat transmitting area of the sheet.

When the thickness (t) of the viscous solution containing a polymer P is less than 0.05 mm, the evaporation of the solvent from the surface layer proceeds efficiently to increase the drying speed, but the amount of the viscous solution containing a polymer P placed on the sheet cannot be increased and accordingly the amount to be treated per one run is decreased to reduce the productivity, additionally, the sheet contact area per a unit weight of the polymer dried product becomes so big that the removal of the polymer dried product may become difficult. On the other hand, when the thickness of the solution on the belt becomes not less than 10 mm, the surface layer of the viscous solution containing a polymer causes the skinning during the drying process, to prevent the incorporated solvent from evaporating, thus the drying efficiency is decreased drastically. If the drying temperature is raised too much for forcing the solvent to evaporate, re-solubility of the polymer dried product in water as well as the storing stability is deteriorated. It is desirable to keep the thickness of the solution to be placed in the form of a line as even as possible, in order to obtain uniform drying conditions.

When the width (w) of the line is less than 0.5 mm, the drying can be carried out efficiently, but the amount of the solution resting in one line becomes very little and the productivity cannot be increased. On the other hand, when the width exceeds 100 mm and becomes too broad, it is difficult to effectively make use of the features of the present invention, which means the form of a line is employed to improve the drying efficiency by enlarging the surface area and to improve the releasability from the sheet. In order to assure the drying acceleration effect due to the enlarged surface area, it is preferable to control the sectional area to be in the range of 0.03 to 0.2 $cm^2$, while above-mentioned preferable thickness and width of the line are reserved.

When the viscous solution containing a polymer P is placed in the form of a line on the sheet, the distance (d) between the neighboring lines is an important factor to carry out the drying process efficiently, even when the lines are expanded in their lateral directions with leaving room for an interval between the neighboring lines when the polymer is foamed and expanded by the evaporation of the solvent from the viscous solution containing a polymer P during the drying process. In order to secure the interval which allows the expansion of the lines in the lateral directions during the drying process, the distance (d) between the neighboring lines of the viscous solution containing a polymer, placed in the form of a line on the belt and not yet dried, is preferably controlled to be not less than 0.5 mm, more preferably not less than 1 mm, further more preferably not less than 3 mm. Provided that, when the distance (d) is too large, the resting area of the viscous solution containing a polymer on the sheet 1 becomes small, and the amount to be dried in one run is decreased to reduce the productivity. Accordingly, it is desirable to control the distance (d) to be not more than 100 mm (maximum), preferably equal to or less than 30 mm, more preferably not more than 15 mm.

Figure 7:
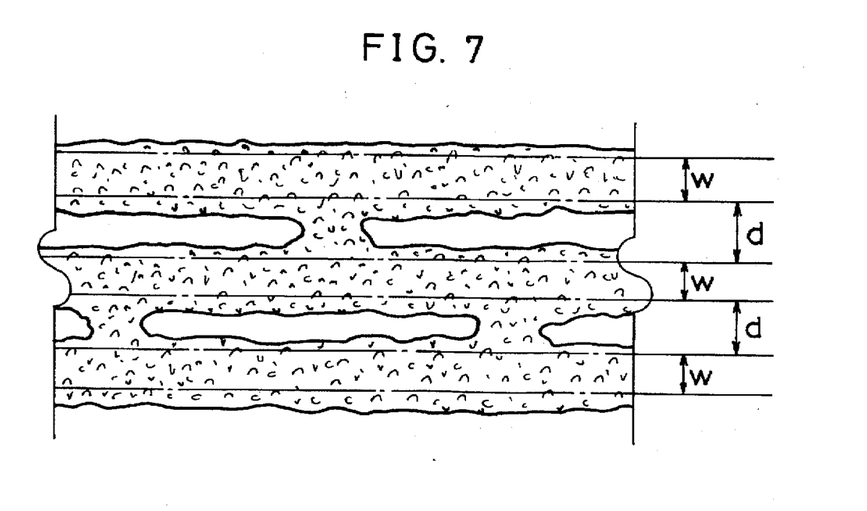
FIG. 7 is a plan view illustrating the condition wherein the drying is almost completed.

Accordingly, the distance (d) between the linear bodies means the distance between the neighboring linear bodies of the viscous solution containing a polymer in undried conditions prior to the drying process, and when the drying process is nearly completed, the sides of the linear bodies can be partly adhered to each other as shown in FIG. 7. The chain dash in the FIG. 7 shows the side line of the undried line placed on the belt, which shows that the line is expanded by the foaming during the drying process to make the distance (d) smaller.

As described above, according to the present invention, it is desirable to appropriately control the thickness and width of the line and the distance between the lines of the viscous solution containing the polymer resting in the form of a line on a sheet, and in order to carry out the drying process efficiently in putting these together, it is desirable to control the total resting area of the viscous solution containing a polymer placed in the form of a line to be not more than 80% of the heat transmitting area of said sheet, preferably in the range of 15 to 75%. If the resting area exceeds 80% of the heat transmitting area (or drying effective area), enough distance can not be secured between the neighboring lines, and the sides of the neighboring lines are adhered to each other in the undried condition or in the initial stage of the drying process, so that the effect by enlarging of drying effective area cannot be shown well and the good drying efficiency intended according to the present invention cannot be obtained.

The above-mentioned expansion by foaming associated with the drying process is not easily caused when the heating temperature is relatively low, however, it appears remarkably when the drying temperature is high. Accordingly, when the drying temperature as high as 160° C. or more is employed, it is preferable to control the resting area to be in the range of 15 to 75% of the drying effective area and the distance (d) between the sides of the neighboring lines of the viscous solution containing a polymer to be not less than 3 mm. The resting area exceeding 80% of the drying effective area provides an undesired problem such as an accelerated deterioration of the belt (or sheet), since the contraction of the polymer caused during the drying process distorts the belt. The drying effective area here means a heating effective area (heat transferring area) which is an area on the sheet contributing to the drying process. For example, when the sheet is heated by a plate heater, the area which is not in contact with the plate heater is not included in this drying effective area.

The polymer dried product dried on the belt 1 is cooled in the downstream cooling zone C to a temperature preferably not more than 60° C., and crushed and removed from the belt 1 by a scraper 6 (FIG. 1) and the like at the downstream end of the belt 1, and obtained in the form of a powdery or flaky dried product after collecting the crushed product or after further subjecting to crushing into an arbitrary size by a crusher (not shown in the FIG.).

For placing the viscous solution containing a polymer in the form of a line as shown in FIG. 2, the viscous solution containing a polymer P is discharged from the discharge device 3 having a plurality of discharge orifices 3n which are provided in the lateral direction of the rotary belt 1, onto the upper surface of the rotary belt 1, and by appropriately setting the caliber of the discharge orifice, the distance between the orifices and the amount of the solution to be discharged, the width and the thickness of the line, and the distance between the lines can be arbitrarily controlled. When the solution is discharged intermittently through the discharge orifices 2n, the solution can be placed in the form of intermittent lines as shown in FIG. 4. For placing the viscous solution containing a polymer in a zigzag line as shown in FIG. 3, one discharging orifice 3n which reciprocates in the direction shown by the arrow in FIG. 3 (that means the lateral direction of the rotary belt) is provided in the discharge device 3, and the viscous solution containing the polymer P is discharged onto the rotary belt 1 while the discharge orifice 3n is continuously moved in the direction shown by the arrow. The linear resting pattern in which the solution is placed is not limited to those shown in FIG. 2–FIG. 4, and any linear resting pattern can be employed as far as the thickness (t) and width (w) of the line and the distance (d) between the lines of the viscous solution containing a polymer P placed in the form of a line (including the continuous line, and the intermittent line) are in the above-mentioned preferable ranges, for example, the solution can be placed in the form of a plurality of waves.

Figure 8:
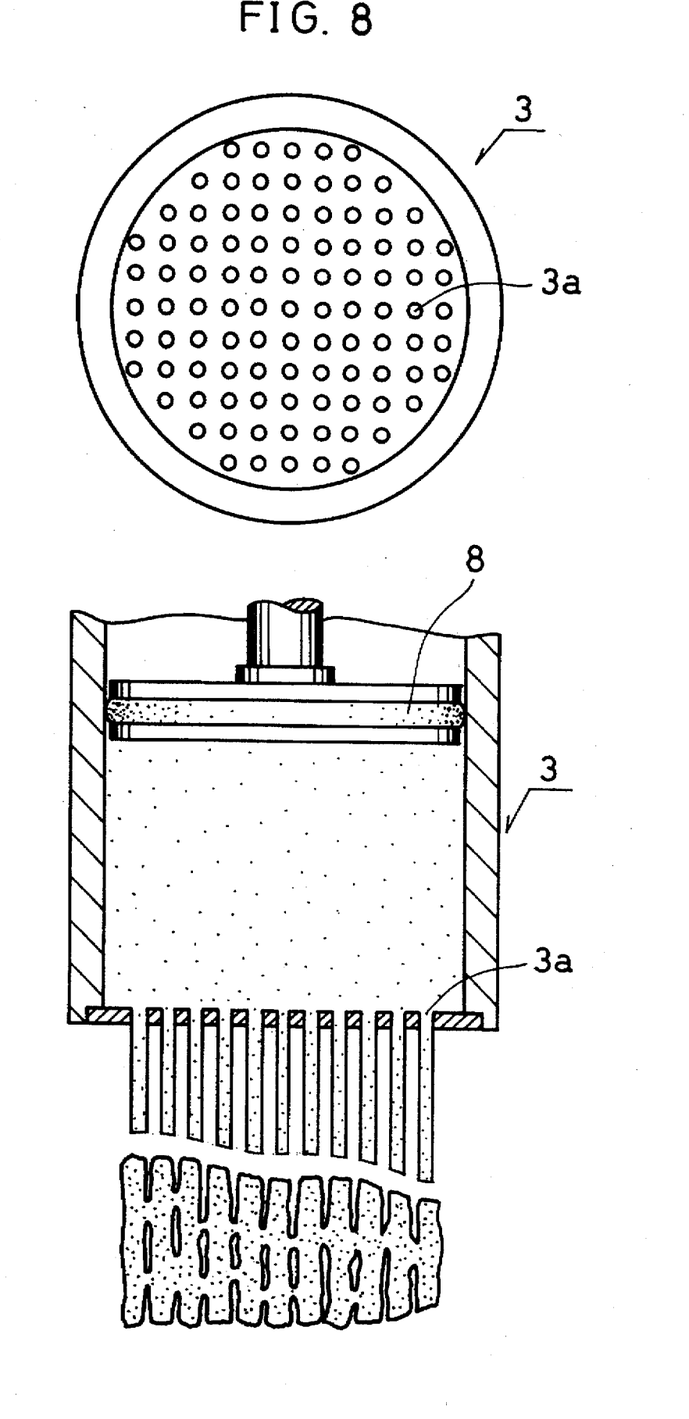
FIG. 8 is a schematic illustration showing how the viscous solution containing a (meth)acrylic acid-based polymer is discharged downwards in the form of a line through a lot of discharge orifices and dried.

Now, referring to FIG. 8, which is a schematic cross-sectional view illustrating how the viscous solution is discharged in the form of a line according to the above-mentioned process (2) that is "a process wherein a viscous solution containing a (meth)acrylic acid-based polymer is discharged in the form of a line through a lot of nozzles provided in a discharge device and passed through a drying zone", wherein the viscous solution containing a polymer P is charged in the discharge device 3 having a lot of discharge orifices 3a, then pressurized by an extrusion plunger 8, so that the viscous solution containing a polymer P is discharged in the form of a line through the discharging orifice 3a, and passed through a drying zone provided downwards of the discharging orifice 3a, which is not shown in the figure, and dried. By changing the size of the discharging orifice 3a or the discharging speed, the cross-sectional area of the viscous solution containing a polymer P discharged in the form of a line can be freely controlled, and additionally the distance between the lines can be set by changing the distance between the discharge orifices 3a to be attached. The preferable distance and the cross-sectional area for this case can be practically the same as the preferable cross-sectional area and the distance for the case wherein the solution is placed in the form of a line on the rotary belt.

When the above-mentioned process (3) "a process wherein a viscous solution containing a (meth)acrylic acid-based polymer is placed in the form of a line inside of a dryer such as a hot air dryer and heated and dried" is employed, the viscous solution containing a polymer is placed in the form of a line having the preferable thickness and width of the line and the distance between the lines as explained for the above-mentioned process (1), on a sheet made of a releasing resin such as polyethylene tetrafluoride (Teflon) and the like, then it is inserted into the dryer and heated and dried at an appropriate temperature. This process, in comparison with the above-mentioned process (1), has a somewhat inferior productivity since continuous drying process cannot be carried out, however, since the drying equipment is relatively cheap, it is a practical process to be employed for a production in multikind and small quantity.

As for the heating means, a noncontact type heating method such as hot air, infrared radiation, far infrared radiation, and micro waves can be applied for the heating from above, and for the heating from below, both a contact type heating method such as a plate heater utilizing such heat source as heat medium, steam, and electricity, and a non-contact type heating method such as hot air, infrared radiation, far infrared radiation, and micro waves, can be applied.

The preferable temperature for drying the viscous solution containing a (meth)acrylic acid-based polymer in the above-mentioned process depends on the boiling point of the solvent which should be evaporated and removed during said drying process, or on the pressure conditions, and it is not possible to determine it uniformly. However, when the most typical viscous aqueous solution containing a (meth) acrylic acid-based polymer is dried, it is preferable to keep the drying zone under normal pressure, and to control the temperature of the drying zone to be in the range of 100° to 230° C., or to keep the drying zone under reduced pressure and to control the temperature of the drying zone in the range of 70° to 200° C. It is preferable to employ such drying conditions to carry out the drying process more effectively while the change of properties of a (meth)acrylic acid-based polymer, and the like, is more securely controlled.

When the drying temperature is below 70° C., the problem such as skinning is hard to be caused, but, the time required for the drying is prolonged to reduce the productivity. The temperature over 230° C. is not desirable either, since a (meth)acrylic acid-based polymer is subjected to branching reaction or cross-linking reaction to generate a water insoluble substance or to degrade the storing stability of the polymer though the drying efficiency is increased.

As for the heating method, any heating process, such as a process wherein the viscous solution containing a polymer placed on the sheet is directly heated from above, a process in which the viscous solution containing the polymer is heated through heat transmission by heating the sheet from below, a process wherein hot air is circulated for heating, can be utilized. For heating the solution placed on the sheet in the form of a line, a process for heating the solution from below the sheet is recommended as the most preferable process, since the viscous solution containing a polymer in the form of a line is heated from the bottom surface, and the evaporation of the solvent proceeds upwards, so that the skinning on the surface can be controlled and the drying can be carried out efficiently.

A (Meth)acrylic acid-based polymer whose degree of neutralization is not more than 50 mol % to be heated and dried in the above-mentioned process, has a low glass transition point, thus it is plasticized at the drying temperature, and under that condition, not only its removal from the sheet is difficult but also even its handling is difficult. Accordingly, after the drying by heating is completed, it is desired to be cooled to around 60° C. or less and removed from the sheet. As for the cooling process, such process as cooling by contacting with a cooling plate using cold water and the like, or cooling by cold wind can be employed, and a contact type cooling method, a non-contact type cooling method or methods of cooling from above, below or both can be appropriately selected and employed.

According to the present invention, it is possible to arbitrarily combine various drying conditions including the thickness and width of the line and the distance between the lines as described above, however, when the productivity is taken into consideration, it is preferable to set such drying conditions that allow the drying process to be carried out with the drying efficiency of not less than 200 (g/m$^2$ hr), preferably equal to or more than 900 (g/m$^2$ hr), and it is preferable to decrease the water content in the polymer obtained by drying to below 6% by weight. When the water content is not less than 6% by weight, the drying is insufficient and the polymer has stickiness, thus not only the removal from the sheet but also the crushing into powder become difficult.

The polymer removed from the sheet can be in the form of a line, a sheet or a film, and depending on uses, they can be directly cut to an appropriate size and brought to the commercial stage, but for increasing the re-solubility in water, it is desirable to crush them into powder, followed by classification if necessary, before being brought to the commercial stage.

EXAMPLES

To further illustrate this invention, and not by way of limitation, the following Examples are given. The methods employed in the following Examples for testing the physical properties are as follows.
The ratio of the resting area to the drying effective area (abbreviated as resting area ratio) (%):
The ratio of the resting area of the viscous solution containing a polymer placed in the form of a line to the area of the sheet effective for drying (%).

Drying efficiency (g/m² hr):

Drying processes 1–3: The weight of the dried polymer (g) obtained per 1 m² of the drying effective area for 1 hour (9/m² hr).

Drying process 4: The weight of the dried polymer (kg) obtained per 1 m³ of the drying zone for 1 hour (9/m³ hr).

Water content of the polymer (wt %):

About 1 g of the powder obtained by crushing the dried polymer is placed in a petri dish to give a thickness of about 1 mm, and subjected to drying at 105° C. for 180 minutes, and the water content is measured from the resulting weight loss.

Storing stability of the polymer:

A viscosity (A) of an aqueous solution wherein the polymer powder immediately after the drying process is re-dissolved to give a concentration of 10% by weight, and a viscosity (B) of an aqueous solution wherein the polymer powder having been stored for 30 days at 60° C. is re-dissolved to give a concentration of 10% by weight are measured to evaluate the storing stability from B/A. (The closer the numerical value to 1, the better the storing stability.)

Solubility of the polymer in water:

The solubility is evaluated if there found any insoluble substance or not after an aqueous solution of 10% by weight is allowed to stand at a room temperature for 3 hours.

(Meth)acrylic acid-based polymer Production Example 1

In a four-neck flask having a capacity of 5 liters which was equipped with a thermometer, a nitrogen introducing tube, a stirrer and a reflux condenser, was put 1194 g of water and heated to 100° C. Then 70 g of 1 wt % aqueous solution of 2,2'-azobis-2-amidinopropane dihydrochloride as a polymerization initiator, and 2666 g of 30 wt % aqueous solution of acrylic acid as a polymerizable monomer, were continuously added dropwise under normal pressure at a boiling temperature for 60 minutes. Thereafter, 70 g of 1 wt % aqueous solution of 2,2'-azobis-2-amidinopropane dihydrochloride was again continuously added dropwise under normal pressure at a boiling temperature for 60 minutes to promote the polymerization reaction. After the completion of dropping, the mixture was stirred further for 30 minutes at the boiling temperature to complete the polymerization reaction to give an aqueous solution of polyacrylic acid (polymerization product P1) having the solid content of 20%.

The viscosity of the aqueous solution of the polymer (20%) at 25° C. was 60,000 cps, and the weight average molecular weight of the polyacrylic acid was 800,000.

(Meth)acrylic acid-based polymer Production Example 2

In a four-neck flask having a capacity of 5 liters which was equipped with a thermometer, a nitrogen introducing tube, a stirrer and a reflux condenser, was put 2034 g of water and heated to 100° C. Then 70 g of 10 wt % aqueous solution of 2,2'-azobis-2-amidinopropane dihydrochloride as a polymerization initiator, and 1600 g of 80 wt % aqueous solution of acrylic acid as a polymerizable monomer were continuously added dropwise under normal pressure at a boiling temperature for 120 minutes to carry out a polymerization reaction. Thereafter, 296 g of 48 wt % aqueous solution of sodium hydroxide was continuously added dropwise under normal pressure at a boiling temperature for 20 minutes, and after the completion of dropping, the mixture was stirred further for 30 minutes at the boiling temperature to complete the polymerization reaction to give an aqueous solution of polyacrylate (polymerization product P2) having the solid content of 34% and the degree of neutralization of 30%.

The viscosity of the aqueous solution of the polymer (34%) at 25° C. was 20,000 cps, and the weight average molecular weight of the polyacrylate was 200,000.

(Meth)acrylic acid-based polymer Production Example 3

In a four-neck flask having a capacity of 5 liters which was equipped with a thermometer, a nitrogen introducing tube, a stirrer and a reflux condenser, were put 820 g of water and 466 g of maleic anhydride (copolymerizable monomer) and heated to 100° C. Then 500 g of 10 wt % aqueous solution of 2,2'-azobis-2-amidinopropane dihydrochloride as a polymerization initiator, and 1714 g of 80 wt % aqueous solution of acrylic acid as a polymerizable monomer were continuously added dropwise under normal pressure at a boiling temperature for 120 minutes to carry out a polymerization reaction. After the completion of dropping, the mixture was stirred further for 30 minutes at the boiling temperature to complete the polymerization reaction to give an aqueous solution of polyacrylic acid—maleic acid copolymer (polymerization product P3) having the solid content of 56%.

The viscosity of the aqueous solution of the copolymer 56%) at 25° C. was 46,000 cps, and the weight average molecular weight of the copolymer was 10,000.

(Meth)acrylic acid-based polymer Production Example 4

In a four-neck flask having a capacity of 5 liters which was equipped with a thermometer, a nitrogen introducing tube, a stirrer and a reflux condenser, was put 1224 g of water and heated to 100° C. Then 40 g of 2 wt % aqueous solution of sodium persulfate as a polymerization initiator, and 2666 g of 30 wt % aqueous solution of acrylic acid as polymerizable monomer were continuously added dropwise under normal pressure at a boiling temperature for 60 minutes to carry out a polymerization reaction. Thereafter, 70 g of 2 wt % aqueous solution of sodium persulfate was continuously added dropwise under the same pressure at the same temperature for 15 minutes, and after the completion of dropping, the mixture was stirred further for 30 minutes at the boiling temperature to complete the polymerization reaction to give an aqueous solution of polyacrylic acid (polymerization product P4) having the solid content of 20%.

The viscosity of the aqueous solution of the polymer (20%) at 25° C. was 30,000 cps, and the weight average molecular weight of the polyacrylic acid was 600,000.

(Meth)acrylic polymer Production Example 5

In a separable flask having a capacity of 1 liter which was equipped with a thermometer, a nitrogen introducing tube, a stirrer and a reflux condenser, were put 200 g of methacrylic acid (polymerizable monomer) and 780 g of water, and nitrogen gas was blown into it with stirring to remove the oxygen dissolved in the aqueous solution, then 20 g of 20 wt % aqueous solution of 2,2'-azobis-2-amidinopropane dihydrochloride was put into it as a polymerization initiator, and the polymerization reaction was carried out in a thermostat bath at 60° C. The aqueous solution began to increase its viscosity after 5 minutes, and in 15 minutes after the start of the polymerization, the temperature of the reaction solution reached to the highest temperature of 79° C. The polymerization was carried out for 3 hours while the temperature of the thermostat bath was kept at 60° C. to give an aqueous solution of polymethacrylic acid (polymerization product P5) having the solid content of 20%.

The viscosity of the aqueous solution of the polymer (20%) at 25° C. was 60,000 cps, and the weight average molecular weight of the polymethacrylic acid was 200,000.

(Meth)acrylic polymer acid-based Production Example 6

In a kneader having a capacity of 7 liters which was equipped with a thermometer, a nitrogen introducing tube, a stirrer and a reflux condenser, were put 4560 g of water and 1250 g of 80 wt % aqueous solution of acrylic acid and heated to 40° C. Then 20 g of 0.1 wt % aqueous solution of 2,2'-azobis-2-amidinopropane dihydrochloride was added as a polymerization initiator to start the polymerization reaction. When the temperature of the reaction system reached to 73° C., the polymerization reaction was continued for 2 hours at that temperature to give an aqueous solution of polyacrylic acid (polymerization product P6) having the solid content of 17%.

The viscosity of the aqueous solution of the polymer (17%) at 25° C. was 600,000 cps, and the weight average molecular weight of the polyacrylic acid was 2,000,000.

Examples 1–8, 10–13 and Reference Examples 1–8

Polymerization product P1–P6 obtained in the above-mentioned Production Examples 1–6 were subjected to drying wherein the product was continuously placed on a sheet in the form of a line and passed through a drying zone as shown in the following drying methods 1–3. The drying process was carried out while the thickness and width of the line and the distance between the lines, the resting area of the polymerization product placed in the form of a line on the sheet, heating conditions and cooling conditions were changed variously and the physical properties of the obtained polymers were evaluated. The whole results are shown in Tables 1–3.

Example 9

The polymerization product P6 obtained in the Production Example 6 was subjected to drying wherein the product was discharged in the form of a rod (the diameter of the nozzle was 2 mm, the diameter of the rod was about 3 mm, the distance between the rods was about 8 mm) into a drying zone of 200° C. as shown in the following drying method 4 (see also FIG. 8).

The drying efficiency obtained in the above drying process was 80 kg/m$^3$ hr per cubic meter of volume of the drying zone. The color of the obtained dried polymer was white and the water content was 2.8%, storing stability was 1.02 and the re-solubility in water was good.

Drying method 1

As schematically shown in FIG. 1, in this method, heating was carried out by heat transmission with a heating plate 4, and cooling was carried out by heat transmission with a cooling plate 5 from below an endless belt 1(made of a glass fiber cloth having resistance to temperatures as high as 260° C., which was impregnated with Teflon) rotated by a pair of rollers 2a and 2b.

The heating conditions and the cooling conditions were changed as shown in Tables 1–3. The length of the heating plate was 100 cm, the length of the cooling plate was 20 cm. Drying was carried out continuously as follows; each polymerization product P was discharged through a lot of discharge orifices 3n of the feeder of the polymerization product 3 and placed on the endless belt 1 in the form of a line (see FIG. 2) having the thickness and width of the line, the distance between the lines and the resting area shown in Tables 1–3, then passed through the drying zone D on the rotating belt, then passed through the cooling zone C. After cooling, the dried product of each polymer was removed by scraper 6.

Drying method 2

A hot air dryer wherein drying was carried out by sending hot air in the lateral direction was used and the polymerization product P was placed on a Teflon sheet having resistance to temperatures as high as 260° C., in the form of a line having the thickness and width of the line, the distance between the lines, and the resting area shown in Table 1, and put on a metal net in the hot air dryer, then hot air drying and cold air cooling were carried out under the conditions shown in Table 1. When the dried product was cooled to a temperature which was not more than 60° C., the dried product was removed from the sheet.

Drying method 3

The same drying method as above-mentioned drying method 2 was carried out except that a polycarbonate sheet having resistance to temperatures as high as 135° C. was used instead of the Teflon sheet.

Drying method 4

An extrusion discharge device having a lot of discharge orifices (diameter of 2 mm) was employed as shown in FIG. 8, and the polymerization product P6 was discharged through said discharge orifices (the diameter of the discharged substance was about 3 mm, the distance between the discharge orifices was about 8 mm) and passed through a heating and drying zone at 200° C. and dried.

TABLE 1

| Example Nos. | 1 | 2 | 3 | 4 | 5 | 6 | 7 | 8 |
|---|---|---|---|---|---|---|---|---|
| Drying method | 1 | 1 | 1 | 3 | 2 | 1 | 1 | 2 |
| Polymerization product | P1 | P1 | P1 | P1 | P1 | P1 | P6 | P6 |
| Thickness of line (mm) | 3 | 3 | 1 | 3 | 3 | 3 | 7 | 0.5 |
| Width of line (mm) | 3 | 3 | 3 | 3 | 70 | 3 | 10 | 40 |
| Distance between lines (mm) | 5 | 5 | 5 | 5 | 80 | 5 | 15 | 30 |
| Resting area ratio (%) | 35 | 35 | 35 | 35 | 40 | 53 | 40 | 60 |
| Heating temperature (°C.) | 150 | 200 | 110 | 150 | 180 | 80 | 200 | 150 |
| Heating time (minute) | 40 | 25 | 40 | 40 | 45 | 120 | 35 | 60 |
| Pressure | normal | normal | normal | normal | normal | normal | normal | normal |
| Cooling temperature (°C.) | 30 | 30 | 50 | 30 | 50 | 30 | 50 | 30 |
| Cooling time (minute) | 8 | 5 | 8 | 8 | 8 | 8 | 8 | 8 |
| Releasability | good | good | good | good | good | good | good | good |
| Drying efficiency (g/M$^2$.hr) | 1100 | 1340 | 1000 | 1040 | 850 | 680 | 230 | 460 |

TABLE 1-continued

| Example Nos. | 1 | 2 | 3 | 4 | 5 | 6 | 7 | 8 |
|---|---|---|---|---|---|---|---|---|
| Color of dried polymer | white | white | white | white | white | white | white | white |
| Water content (%) | 1.9 | 1.3 | 1.7 | 2.1 | 4.7 | 2.3 | 4.8 | 3.8 |
| Storing stability | 1.03 | 1.00 | 1.05 | 1.09 | 1.05 | 1.01 | 1.02 | 1.05 |
| Solubility in water | good | good | good | good | good | good | good | good |

TABLE 2

| Example Nos. | 10 | 11 | 12 | 13 |
|---|---|---|---|---|
| Drying method | 1 | 1 | 1 | 1 |
| Polymerization product | P2 | P3 | P4 | P5 |
| Thickness of line (mm) | 3 | 3 | 2 | 3 |
| Width of line (mm) | 3 | 3 | 3 | 3 |
| Distance between lines (mm) | 5 | 5 | 5 | 5 |
| Resting area ratio (%) | 35 | 35 | 35 | 35 |
| Heating temperature (°C.) | 150 | 150 | 150 | 150 |
| Heating time (minute) | 35 | 45 | 35 | 35 |
| Pressure | normal | normal | normal | normal |
| Cooling temperature (°C.) | 30 | 30 | 30 | 30 |
| Cooling time (minute) | 7 | 9 | 7 | 7 |
| Releasability | good | good | good | good |
| Drying efficiency (g/M².hr) | 1100 | 960 | 1030 | 1030 |
| Color of dried polymer | white | white | white | white |
| Water content (%) | 2.6 | 2.9 | 2.5 | 2.1 |
| Storing stability | 1.04 | 1.10 | 1.20 | 1.03 |
| Solubility in water | good | good | good | good | and good re-solubility in water, but showed no change of properties such as yellowing, which shows efficient drying. In Example 12, the polymer to be dried was obtained by using a polymerization initiator other than an azo compound, and the resulting dry polymer showed a little bit inferior storing stability.

On the contrary, in Reference Examples 1–8, drying was carried out under the conditions wherein some of the preferable requirements specified according to the present invention was not satisfied and the resulting product showed a little bit inferior results in the releasability, drying efficiency, or quality of the dried polymer as shown below.

Reference Example 1: The dried polymer turned yellow since the heating temperature in drying was too high. The product also showed inferior storing stability and poor re-solubility in water.

Reference Example 2: The product could not be removed from the belt since the cooling temperature after the heating and drying was too high.

Reference Example 3: This is an example wherein the polymerization product was placed on the whole surface of the belt, thus the enlarged surface effect could not be obtained at all during the drying, and as the result, the drying efficiency was poor and the removal from the belt could not be carried out well, either.

Reference Example 4: The thickness of the polymerization product placed in the form of a line was too big, thus the

TABLE 3

| Ref. Examples Nos. | 1 | 2 | 3 | 4 | 5 | 6 | 7 | 8 |
|---|---|---|---|---|---|---|---|---|
| Drying method | 1 | 1 | 1 | 1 | 1 | 1 | 1 | 1 |
| Polymerization product | P1 | P1 | P1 | P1 | P1 | P1 | P1 | P1 |
| Thickness of line (mm) | 3 | 3 | 3 | 12 | 3 | 3 | 7 | 0.2 |
| Width of line (mm) | 3 | 3 | — | 70 | 150 | 3 | 3 | 3 |
| Distance between lines (mm) | 5 | 5 | — | 80 | 120 | 5 | 0.3 | 3 |
| Resting area ratio (%) | 35 | 35 | 100 | 40 | 60 | 35 | 90 | 50 |
| Heating temperature (°C.) | 250 | 150 | 150 | 150 | 150 | 40 | 200 | 200 |
| Heating time (minute) | 15 | 40 | 180 | 1440 | 120 | 1440 | 45 | 15 |
| Pressure | normal | normal | normal | normal | normal | reduced | normal | normal |
| Cooling temperature (°C.) | 40 | 70 | 40 | 50 | 30 | 30 | 30 | 30 |
| Cooling time (minute) | 2 | 8 | 288 | 36 | 8 | 8 | 8 | 8 |
| Releasability | good | no releasing | bad | good | bad | bad | bad | bad |
| Drying efficiency (g/M².hr) | 1440 | — | 100 | 130 | 360 | 140 | 710 | 130 |
| Color of dried polymer | yellow | — | white | yellow | white | white | yellow | white |
| Water content (%) | 0.9 | — | 6.5 | 5.6 | 5.3 | 6.7 | 3.6 | 2.7 |
| Storing stability | 0.66 | — | 1.09 | 0.48 | 1.04 | 1.02 | 1.25 | 1.07 |
| Solubility in water | bad | — | good | bad | good | good | bad | good |

As it is clear from Table 1–Table 3, the polymer dried product obtained by the drying method satisfying all the preferable requirements specified according to the present invention (Examples 1–13) showed good storing stability drying efficiency was poor. Further, skinning was caused on the surface layer wherein change of properties of the polymer was found. As the result, storing stability and re-solubility in water were poor.

Reference Example 5: This is an example wherein the width of the polymerization product placed in the form of a line was larger than the preferable range, the drying efficiency was a little bit poor and the removal from the belt was not carried out well.

Reference Example 6: This is an example wherein the heating temperature in drying was too low. Change of properties of the polymerization product was not caused, but the drying efficiency was low, the water content of the dried product was high and the releasability was poor, thus it lacked practicality.

Reference Example 7: Since the distance between the polymerization products placed in the form of a line was smaller than the preferable range (too small), immediately after the product was discharged, the lines were adhered to each other to loose the effect of enlarged drying effective area and change of properties of the dried polymer was caused to decrease the re-solubility in water and to degrade the releasability from the belt well.

Reference Example 8: This is an example wherein the thickness of the line was too small; the releasabillty from the belt was very so bad that continuous operation was difficult.

Effect of the Invention

According to the present invention, a dried product of a (meth)acrylic acid-based polymer having excellent properties including re-solubility in a solvent, particularly in water, storing stability of the thickening properties of a solution obtained after it is dissolved again and the like, can be efficiently obtained. The polymer dried product obtained according to the present invention can be widely used as a thickening agent, a self-adhesive, a water absorbing agent, a flocculating agent and the like, by making use of its excellent properties including adhesive properties, film forming properties, thickening properties and flocculating properties.

I claim:

1. A method of drying a viscous solution containing a (meth) acrylic acid-based polymer comprising a homopolymer or a copolymer containing (meth)acrylic acid and/or a salt thereof as a monomer unit, the degree of neutralization of the acid group contained in the polymer being not more than 50 mol %, wherein said method comprises subjecting said solution to, or passing said solution through, a drying zone, in the form of a line, so that the solvent in the solution is removed and wherein said viscous solution has a viscosity at 25° C. of 100–1,000,000 cps.

2. A drying method according to claim 1, wherein the form of a line is the form of a continuous line or an intermittent line.

3. A drying method according to claim 1, wherein the viscous solution in the form of a line passes through the drying zone and is supported by a moving sheet.

4. A drying method according to claim 1, wherein the viscous solution in the form of a line passes through a plurality of nozzles provided in a discharge device and then passes through the drying zone.

5. A drying method according to any of claims 1–4, wherein the viscous solution is an aqueous solution.

6. A drying method according to claim 5, wherein the drying zone is kept under atmospheric pressure and the temperature of the drying zone is controlled to be 100°–230° C.

7. A drying method according to claim 5, wherein the drying zone is kept under less than atmospheric pressure and the temperature of the drying zone is controlled to be 70°–200° C.

8. A drying method according to claim 3, wherein the total resting area of the viscous solution, resting in the form of a line on a sheet is not more than 80% of the cross-sectional area of the sheet.

9. A drying method according to claim 3, wherein the thickness of the viscous solution placed on the sheet in the form of a line is controlled to be 0.5–10 mm, the width of the line is controlled to be 0.5–100 mm, and the distance between the neighboring lines is controlled to be 0.5–100 mm.

10. A drying method according to claim 9, wherein the thickness of the viscous solution placed on the sheet in the form of a line is controlled to be 1–5 mm, the width of the line is controlled to be 1–50 mm, and the distance between the neighboring lines is controlled to be 1–30 mm.

11. A drying method according to claim 10, wherein the width of the viscous solution containing the polymer placed on the sheet in the form of a line is controlled to be 2–5 mm, and the distance between the neighboring lines is controlled to be 3–5 mm.

12. A drying method according to claim 3, wherein after drying, the dried product of the viscous solution is cooled to a temperature which is not more than 60° C., then the dried product is removed from the sheet.

13. A drying method according to claim 1, wherein a viscous solution containing a (meth)acrylic acid-based polymer is obtained by solution polymerization using an azo compound as radical polymerization initiator.

14. A drying method according to claim 1, wherein the (meth)acrylic acid-based polymer has a weight average molecular weight of 5,000–5,000,000.

* * * * *